United States Patent [19]

Yamamoto

[11] Patent Number: 4,650,606
[45] Date of Patent: Mar. 17, 1987

[54] APPARATUS FOR COLLAPSING BURNABLE POISON RODS FOR STORAGE IN REDUCED VOLUME

[75] Inventor: Yoshimasa Yamamoto, Tokyo, Japan

[73] Assignee: Kabushiki Kaisha Kobe Seiko Sho, Kobe, Japan

[21] Appl. No.: 677,504

[22] Filed: Dec. 3, 1984

[30] Foreign Application Priority Data

Dec. 8, 1983 [JP] Japan .................. 58-232300

[51] Int. Cl.⁴ ..................... G21F 9/00; G21F 9/34
[52] U.S. Cl. ............................. 252/626; 83/19; 83/23; 83/54; 83/425; 83/440; 100/39; 252/633; 376/261; 376/272
[58] Field of Search ............. 252/626, 627, 633; 376/272, 261, 260; 100/39, 35, 6; 83/19, 23, 925 R, 84, 54, 86, 89, 94, 401, 425, 425.1, 440

[56] References Cited

U.S. PATENT DOCUMENTS

| 3,977,940 | 8/1976 | Frisch et al. ............. | 376/282 |
|---|---|---|---|
| 4,290,906 | 9/1981 | Saito et al. ............. | 252/626 |
| 4,377,551 | 3/1983 | Adams .................. | 252/633 |
| 4,434,092 | 2/1984 | Mary .................... | 252/626 |
| 4,511,499 | 4/1985 | Meuschke et al. ......... | 252/626 |
| 4,537,711 | 8/1985 | Wilhelm et al. ........... | 252/626 |

FOREIGN PATENT DOCUMENTS

| 2730723 | 2/1978 | Fed. Rep. of Germany ...... | 252/626 |
|---|---|---|---|
| 2944197 | 5/1981 | Fed. Rep. of Germany . | |
| 0000960 | 1/1982 | Japan .................. | 252/633 |
| 0000959 | 1/1982 | Japan .................. | 252/626 |

*Primary Examiner*—Stephen J. Lechert, Jr.
*Assistant Examiner*—Howard J. Locker
*Attorney, Agent, or Firm*—Oblon, Fisher, Spivak, McClelland & Maier

[57] ABSTRACT

An apparatus for collapsing and storing used burnable poison assemblies in a reduced volume, which includes a hanger member movable up and down for lifting a holder portion of a burnable poison assembly; a cutter for cutting solid portions of thimble plugs and poison rods of the burnable poison assembly hung on the hanger member; a restricting mechanism for holding the poison rods in restricted positions, restraining spontaneous movements in lateral directions; a gripper member movable up and down and capable of releasably gripping the poison rods; a packing mechanism capable of pushing pushing aside previously stored poison rods in a container to put thereinto the poison rods gripped by the gripper member; and a thimble plug handling mechanism for guiding cut-off thimble plugs onto a receptable tray and placing the same in a container.

9 Claims, 17 Drawing Figures

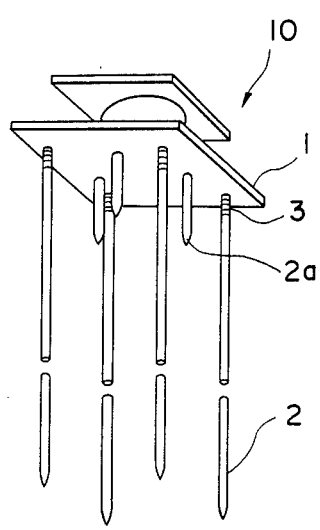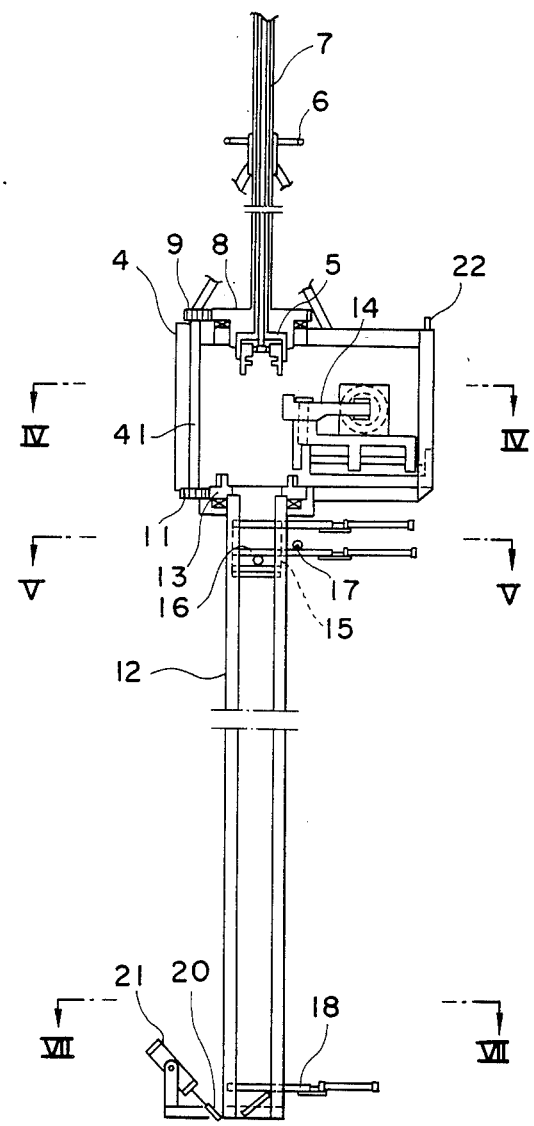

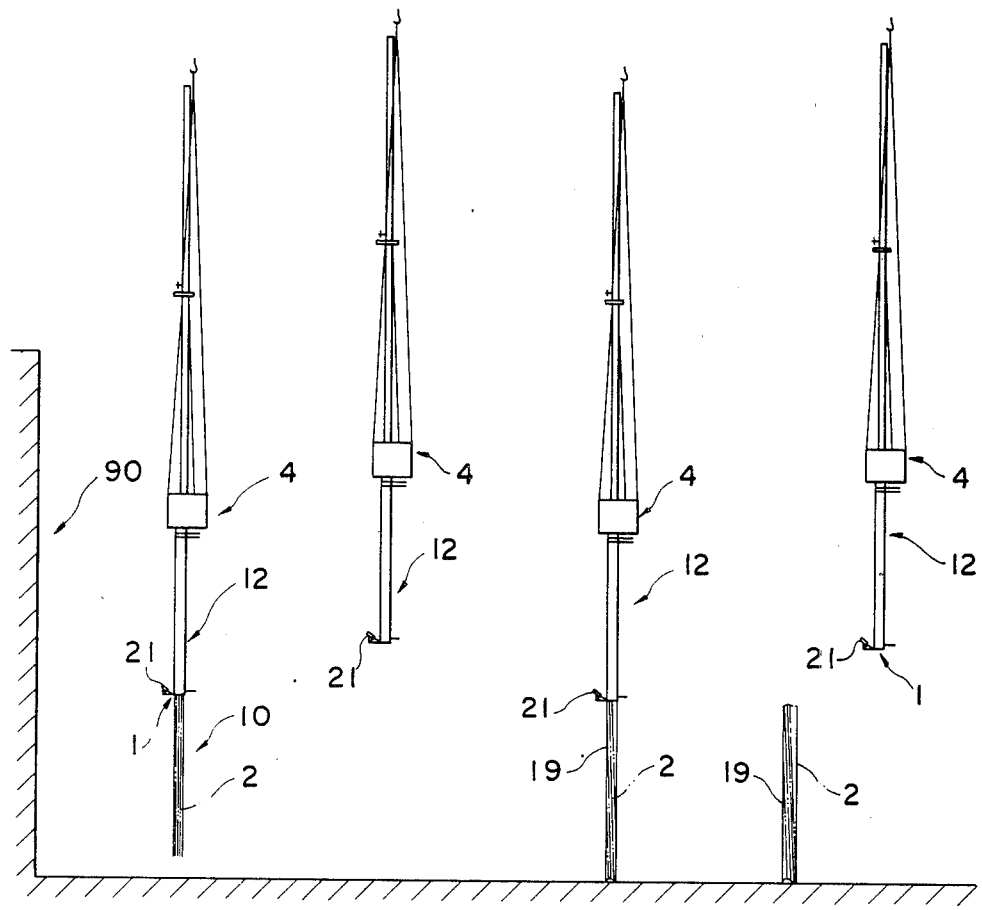

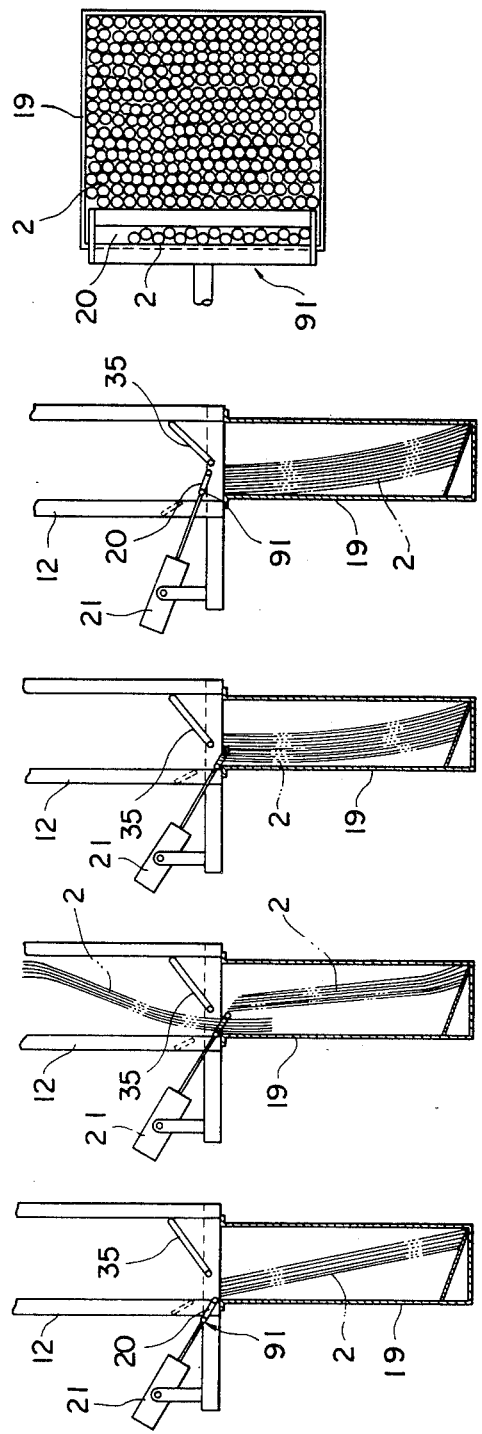

APPARATUS FOR COLLAPSING BURNABLE POISON RODS FOR STORAGE IN REDUCED VOLUME

BACKGROUND OF THE INVENTION

1. Field of the Invention

This invention relates to an apparatus for collapsing used burnable poison assemblies which are inserted in fuel assemblies into a compact form for minimizing the space necessary for storage to a significant degree.

2. Description of the Prior Art

Burnable poison assemblies which are large in volumes as compared with their weights require a large storage space, and therefore there have been proposed various volume reducing apparatus to solve this problem. However, these conventional apparatuses are invariably complicated in construction and large in size, thus resulting in difficulties in handling.

SUMMARY OF THE INVENTION

The present invention contemplates the elimination of the above-mentioned drawbacks of the conventional apparatuses, and has as its object the provision of an apparatus of compact construction, which is easy to handle and capable of reducing the volume of burnable poison assemblies to a marked degree.

More specifically, according to a fundamental aspect of the present invention, there is provided an apparatus for collapsing used burnable poison assemblies into a compact form for storage in a reduced volume, the apparatus comprising, in combination, a hanger member movable up and down for lifting a holder portion of a burnable poison assembly; a cutter for cutting solid portions of thimble plugs and poison rods of the burnable poison assembly hung on the hanger member; restricting means for holding the poison rods in restricted positions, restrained against spontaneous movements in lateral directions; gripper means movable up and down and capable of releasably gripping the poison rods; packing means capable of pushing aside previously stored poison rods in a container to place thereinto the poison rods gripped by the gripper means; and a thimble plug handling mechanism for guiding cut-off thimble plugs onto a receptacle tray and placing the same into another container.

The above and other objects, features and advantages of the invention will become apparent from the following description and appended claims, taken in conjunction with the accompanying drawings which show by way of example some preferred embodiments of the invention.

BRIEF DESCRIPTION OF THE DRAWINGS

In the accompanying drawings:

FIG. 1 is a perspective view of a burnable poison assembly;

FIG. 2 is a vertical section of an apparatus embodying the present invention;

FIGS. 9(A) to 9(D) are diagrammatic views respectively showing various stages through which the burnable poiston assembly is lifted up and put into a container;

FIGS. 10(A) to 10(D) are diagrammatic views showing various stages through which the poison rods are inserted into a container; and FIG. 10(E) shows the orientation of poison rods which have been inserted into a container.

DESCRIPTION OF THE PREFERRED EMBODIMENT

Figure 3:
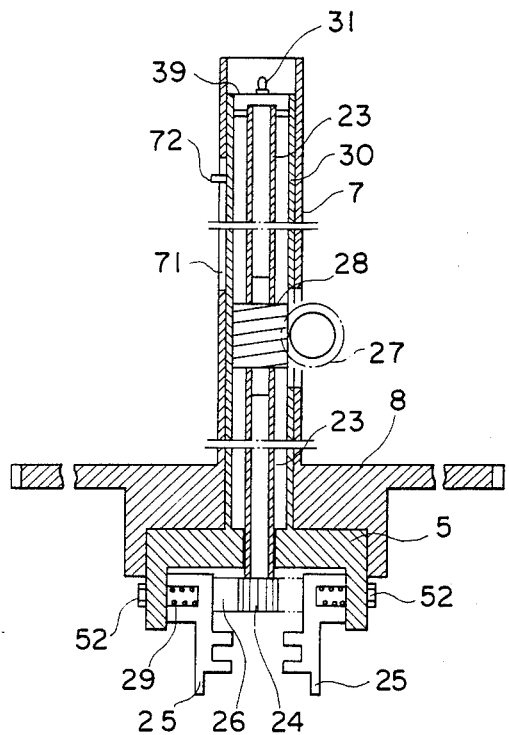
FIG. 3 is an enlarged sectional view of a hanger member.

Referring to the accompanying drawings and first to FIG. 1, there is shown a burnable poison assembly 10 which has a number of poison rods 2 and thimble plugs 2a secured to a holder 1 (a base plate to which the poison rods are fixed), the poison rods 2 forming solid portions 3 at respective upper ends thereof which are fixed to the holder 1. Illustrated in FIG. 2 is a collapsing apparatus which includes an upper frame 4, a lower frame 12 positioned beneath the upper frame 4, a hanger member 5 for lifting a burnable poison assembly 10, a cutter 14 mounted on the upper frame 4 for cutting the solid portions 3 of the poison rods, restricting means 16 for hold the poison rods 2 in a restricted state, gripper means 17 for gripping the poison rods 2, and a packing means 21 provided at the lower end of the lower frame 12. Large gears 8 and 13 are rotatably mounted on upper and lower portions of the upper frame 4, transmitting rotation of the large gear 8 to the lower large gear 13 through small gears 9 and 11 which are mounted at the upper and lower ends of a shaft 41, respectively, to rotate the large gears 8 and 13 at uniform rotational speeds. The lower frame 12 is securely fixed to a lower portion of the large gear 13. Secured to an upper portion of the upper frame 4 is a hoist ring 22 which is lifted up by a crane when moving the apparatus as a whole.

Figure 4:
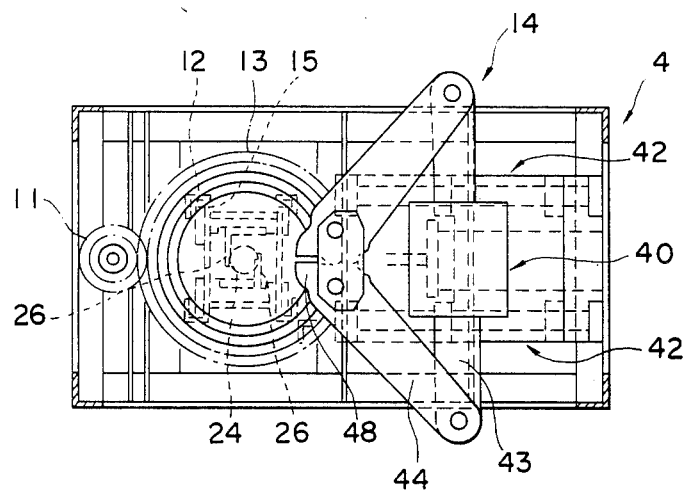
FIG. 4 is a sectional view taken on line IV—IV of FIG. 2.

The hanger member 5 is arranged as shown particularly in FIGS. 3 and 4. Namely, the hanger member 5 is fitted in the lower portion of the large gear 8 in such a manner as to block their relative rotation, supporting on the lower side a pair of opposing clamps 25 through a shaft 52. The clamps 25 are provided with securely fixed racks 26 and urged toward each other by springs 29. The large gear 8 is rotatably retained in position by the upper frame 4, and the hanger member 5 is rotatable with the large gear 8 but it is movable downward independently of the gear 8. The racks 26 are faced toward each other in a direction perpendicular to the surface of FIG. 3, and meshed with an intervening pinion 24 which is mounted at the lower end of a center shaft 23. Accordingly, upon rotating the pinion 24, the racks 26 are moved to the left and right to draw the clamps 25 toward each other. The hanger member 5 is not limited to such an arrangement, and can be realized in various modified forms. For example, there may be employed vertical gripping means instead of the lateral gripping means like clamps 25.

A hollow outer shaft 7 is mounted on the large gear 8 and fittingly receives therein an intermediate shaft 30 which is secured at its lower end to the hanger member 5. The outer shaft 7 is provided with an axially extending slit 71 to receive for vertical movements therein a pin 72 which is provided on the intermediate shaft 30. A gear 28 which is fixedly mounted on the center shaft 23 is meshed, through the outer and intermediate shafts 7 and 20, with a gear 27 which is mounted on the outer shaft 7 and which can be rotated from the outside to turn the center shaft 23. A holder member 39 is provided on upper end portions of the center and intermediate shafts 23 and 30 to thereby rotatably hold the center shaft 23. A hoist ring 31 which is provided on the upper side of the holder member 39 is lifted by a wire to move the hanger member 5 up and down. Further, a handle 6 is secured to the outer shaft 7 as shown particularly in FIG. 2. This handle 6 and the gear 27 are operated manually or automatically.

Located in the upper frame 4 is a cutter 14, which is constituted by a drive means 40 movable on and along guide rails 42 toward the center shaft 23, arms 43 retractably protrudable from the drive means 40, and forearms 44 connected to the arms 43 and provided with cutter blades 48 at the fore ends thereof.

Figure 5:
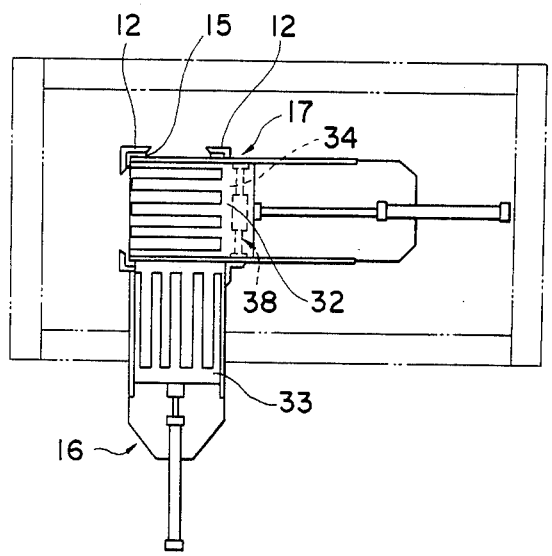
FIG. 5 is a sectional view taken on line V—V of FIG. 2.
Figure 6:
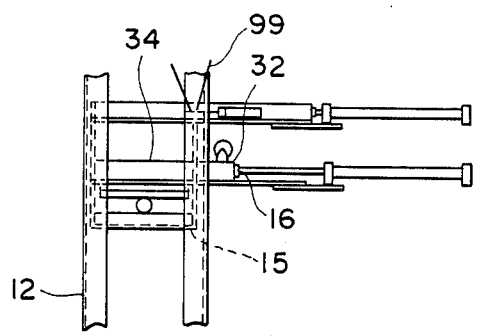
FIG. 6 is a front view of the same apparatus.

Referring to FIGS. 5 and 6, there are shown the restraint means 16 and grip means 17, the restraint means 16 including a pair of comb-like restraint plates 32 and 33 which are movable back and forth in perpendicularly intersecting directions. When overlapped in a small frame 15, these restraint plates 32 and 33 form a predetermined number of rows of square apertures in both longitudinal and transverse directions to hold the poison rods 2 therein. The grip means 17 is constituted by a gripper plate 34 of a comb-like form similar to the restraint plate 32, and a drive means 38. The gripper plate 34 is divided into upper and lower halves in FIG. 5, which can be moved in upward and downward directions by the drive means 38 to narrow the apertures formed by the restraint plates 32 and 33, thereby gripping the poison rods 2 which are passed through the apertures. The restraint means 16 and grip means 17 are retained on the small frame 15 which can be moved up and down in the lower frame 12 by manual or automatic operating means (not shown). Similarly, the restraint means 16 and grip means 17 may be operated either manually or automatically. Mounted on top of the upper frame 15 is a thimble plug handler 99 which is provided with a tray or receptacle with a shutter in the bottom wall thereof. The cut-off thimble plugs 2a are guided onto the tray for further treatment.

Figure 7:
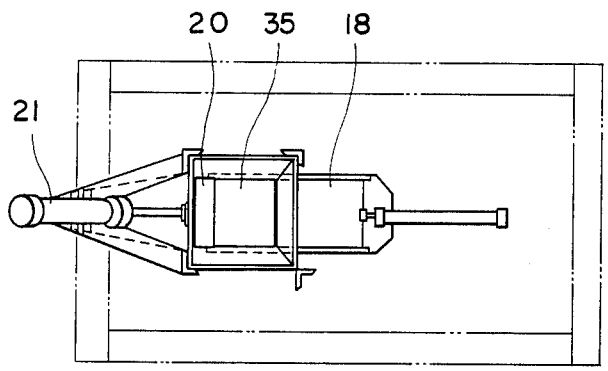
FIG. 7 is a sectional view taken on line VII—VII of FIG. 2.
Figure 8:
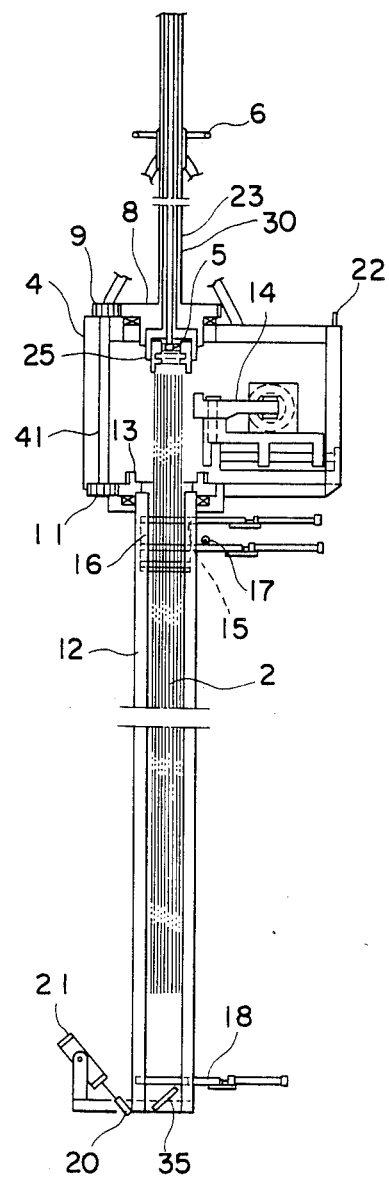
FIG. 8 is a view similar to FIG. 2, showing a burnable poison assembly in lifted state.

As illustrated particularly in FIGS. 7 and 8, a shutter 18 for receiving the poison rods 2, a guide plate 35 and packing means 21 are provided in the lower end portion of the lower frame 12.

In operation, the apparatus as a whole is lifted up by a crane, which is connected to the hoist ring 22, and moved to a position where a burnable poison assembly 10 is located. After opening the shutter 18 and guide plate 35, the hanger member 5 is lowered to the bottom end of the lower frame 12 by loosening the lifting rope (not shown) of the hoist ring 31. Thereafter, the hanger member 5 is grippingly connected to the holder 1 of the burnable poison assembly 10 in a storage pit 90 and lifted up as shown in FIG. 9(A), drawing the burnable poison assembly 10 into the apparatus as shown in FIGS. 8 and 9(B). The gear 28 on the center shaft 23 is arranged to mesh with the gear 27 when the hanger member 5 is lowered so that the center shaft 23 is rotated upon operating the gear 27, moving the clamps 25 toward each other through the pinion 24 at the lower end of the center shaft 23 and racks 26 to grip the burnable poison assembly 10. Upon lifting the hanger member 5, the gears 27 and 28 are disengaged from each other but the gripping force of the clamps 25 is maintained by the springs 29.

Nextly, the shutter 18 is closed, and the restraint plates 32 and 33 of the restricting means 16 are advanced to hold the poison rods 2 in a restricted state on four sides in the apertures formed by these restraint plates. In this state, the poison rods 2 and thimble plugs 2a are cut off one after another or a few at one time by operation of the cutter 14. During this cutting operation, the assembly 10 is rotated by turning the handle 6 which rotates the outer shaft 7, large gear 8 and hanger member 5, so that the poison rods 2 to be cut are directed one after another toward the centrally located cutter blade 48. Although the cut-off poison rods 2 are dropped onto the shutter 18, they are subjected to only an extremely small impact since the distance such are dropped is short. It is also possible to lift up the outer shaft 7 by a crane instad of the upper frame 4 and to rotate the upper frame 4 in the poison rod cuting operation.

After cutting off all of the poison rods and thimble plugs, the lower end of the lower frame 12 is joined to a container 19 as shown in FIG. 9(C), and the poison rods 2 in the container 19 are pressed by a pusher member 91 of the packing means 21 as shown in FIGS. 9(A) and 9(B) to facilitate acommodation of following poison rods. In the next station, the gripper 17 is actuated to grip the poison rods 2, and, after opening the shutter 18, the gripper is lowered to put the poison rods 2 into the container 19 through an opening 20 in the pusher member 91 of the packing means 21 as shown in FIGS. 10(B) and 10(C), followed by elevation of the pusher member 91 as shown in FIG. 10(D). The poison rods 2 which are lowered by the gripper 17 in this manner can be placed in the container without imposing shocks thereto as experienced when dropped by gravity. The pusher member 91 which is movable in horizontal and vertical directions in the foregoing embodiment may be arranged to able to move in horizontal direction alone, moving it up and down with the apparatus as a whole which is lifted by a crane. Thereafter, the hanger member 5 is lowered and the apparatus as a whole is lifted up to transfer the holder 1 of the assembly 10 on the hanger 5 and the thimble plugs 2a, which are temporarily held in the thimble plug handling mechanism, to another place for storage in a container (not shown). The foregoing operations are repeated, packing a container 19 as shown in FIG. 10(E) with poison rods which have been cut off from a plurality of burnable poison assemblies 10. The cut-off thimble plugs 2a are guided onto and temporarily placed on a tray which is mounted on an upper portion of the small frame 15 and which is provided with a shutter at the bottom thereof. After placing the cut-off poison rods in container 19, the thimble plugs are transferred to a position over another container (not shown), and placed thereinto by opening the bottom shutter.

Although the cutter 14 is movable back and forth in the foregoing embodiment, it may be arranged to be movable also in lateral directions. In such a case, there is no need for rotating the frame for turning the poison rods toward the cutter blade.

As is clear from the foregoing description, the apparatus according to the present invention is compact in construction and capable of collapsing used burnable poison assemblies into a reduced volume suitable for storage, cutting off burnable poison rods and thimble plugs at their solid upper end portions and storing them in storage containers.

Obviously, numerous modifications and variations of the present invention are possible in light of the above teachings. It is therefore to be understood that within the scope of the appended claims, the invention may be practiced otherwise than as specifically described herein.

What is claimed is:

1. An apparatus for collapsing and storing used burnable poison assemblies having thimble plugs and poison rods in a reduced volume, comprising:
   a hanger member movable up and down for lifting a holder portion of a burnable poison assembly;
   a cutter for cutting solid portions of said thimble plugs and poison rods of said burnable poison assembly that are hung on said hanger member;
   restricting means for holding said poison rods in restricted positions and restraining spontaneous movements thereof in lateral directions;
   gripper means movable up and down for releasably gripping said poison rods;
   packing means for shifting aside previously stored poison rods in a first container and for placing thereinto additional poison rods subsequently gripped by said gripper means; and
   a thimble plug handling mechanism for guiding cutoff thimble plugs onto said a receptacle tray and placing said tray in a second container.

2. An apparatus as set forth in claim 1, further comprising an upper frame connected to said hanger member and a lower frame rotatably connected to the lower side of said upper frame, and a hanger shaft supported on said upper frame wherein said hanger member is mounted at the lower end of said hanger shaft so as to be rotatably and vertically movable in vertical alignment with said lower frame.

3. An apparatus as set forth in claim 2, wherein said upper frame is provided with upper and lower large gears mounted on the upper and lower sides thereof for rotation at uniform speeds, said upper large gear being connected to an outer shaft fittingly receiving therein said hanger shaft, and said lower large gear being connected to the upper end of said lower frame.

4. An apparatus as set forth in claim 2, further comprising a center shaft fitted in said hanger shaft a plurality of clamps mounted on the lower side of said hanger member and a rack and pinion mechanism for moving said clamps into clamping positions and which is externally operable through said center shaft.

5. An apparatus as set forth in claim 2, wherein said cutter is mounted on said upper frame and further comprises drive means movable toward and away from said hanger member, and a plurality of arms retractably mounted on said drive means and provided with a cutter blade at fore ends thereof.

6. An apparatus as set forth in claim 2, wherein said restricting means is mounted on said lower frame and further comprises a pair of comb-like restraint plates movable into overlapped, perpendicularly intersecting positions to hold said poison rods in a restricted state in rows and arrays of apertures formed by said restraint plates.

7. An apparatus as set forth in claim 6, further comprising means for moving said small frame up and down in said lower frame and wherein said restricting means is mounted on said lower frame via said small frame.

8. An apparatus as set forth in claim 6, wherein said gripper means is mounted on said lower frame and is adapted to grip said poison rods by narrowing said apertures formed by said restraint plates of said restricting means.

9. An apparatus as set forth in claim 2, wherein said packing means is mounted on a lower end portion of said lower frame and further comprises a shutter for opening and closing the lower end of said lower frame, a guide plate for guiding said poison rods, and a packing member movable in a horizontal direction for shifting aside said previously stored poison rods in a said first container and which is formed with an opening for passing said poison rods therethrough.

* * * * *